US009222458B2

(12) United States Patent
Hart

(10) Patent No.: US 9,222,458 B2
(45) Date of Patent: Dec. 29, 2015

(54) MOORING ANCHOR SYSTEM FOR WAVE ENERGY CONVERTERS (WECS)

(71) Applicant: Philip R. Hart, Yardley, PA (US)

(72) Inventor: Philip R. Hart, Yardley, PA (US)

(73) Assignee: OCEAN POWER TECHNOLOGIES, INC., Pennington, NJ (US)

( * ) Notice: Subject to any disclaimer, the term of this patent is extended or adjusted under 35 U.S.C. 154(b) by 296 days.

(21) Appl. No.: 13/685,705

(22) Filed: Nov. 27, 2012

(65) Prior Publication Data

US 2014/0145442 A1  May 29, 2014

(51) Int. Cl.
*F03B 13/18* (2006.01)

(52) U.S. Cl.
CPC .............. *F03B 13/18* (2013.01); *F05B 2240/40* (2013.01); *F05B 2240/97* (2013.01); *Y02E 10/38* (2013.01)

(58) Field of Classification Search
CPC ......... F03B 13/18; F03B 13/14; B63B 21/00; B63B 21/50
USPC .......... 60/398, 502, 506, 500; 290/53, 54, 43; 114/293
See application file for complete search history.

(56) References Cited

U.S. PATENT DOCUMENTS

2009/0183667 A1* 7/2009 Draper et al. ................. 114/293

* cited by examiner

*Primary Examiner* — Thomas Denion
*Assistant Examiner* — Shafiq Mian
(74) *Attorney, Agent, or Firm* — Henry I. Schanzer, Esq

(57) ABSTRACT

A mooring system for a plurality of wave energy converters (WECs) includes a multiplicity of anchors coupled to form an array of contiguous hexagonal shaped cells. Each cell has 3 WECs and 3 anchors located at the vertices of the hexagon, with a WEC alternating with an anchor going around the perimeter of the cell. Except for the cells at the edges of the array, each WEC is connected to two anchors of its cell and an anchor of an adjacent contiguous cell. Each WEC is connected to three different anchors via 3 mooring lines spaced 120 degrees apart about the WEC. The ratio of the number of anchors per WEC is decreased by connecting each anchor to more than one WEC. The cells can be arranged to form many different patterns. In one embodiment a plurality of WECs and anchors are deployed in a generally triangular formation extending from an apex of the triangular formation to a base.

12 Claims, 6 Drawing Sheets

MOORING ANCHOR SYSTEM FOR WAVE ENERGY CONVERTERS (WECS)

This invention claims priority based on provisional application Ser. No. 61/629,809 filed Nov. 28, 2011, titled MOORING ANCHOR SYSTEM FOR MULTIPLE WAVE ENERGY CONVERTERS (WECS), whose teachings are incorporated herein by reference.

BACKGROUND OF THE INVENTION

This invention relates to wave energy converters (WECs) for converting energy in the waves on the surface of bodies of water to useful energy and, in particular, to the mooring or anchoring of multiple groups or arrays of WECs of the floating buoy type.

One known type of WEC (also referred to herein as a "buoy"), with which the present invention is primarily concerned, comprises a WEC having components (e.g., a float and a spar) which move relative to each other, or are driven into movement, in response to passing surface waves. The relative movement of the components is used for driving an energy transducer (also referred to herein as a power take off device (PTO) for generating useful energy. For retaining WECs in place (i.e., to limit their lateral movement), one practice is to connect each WEC to three anchors spaced around the WEC. However, a problem with this practice is that when many WECs are used for increasing the amount of generated power, the need for three anchors for each WEC (providing an anchor to WEC ratio of 3:1) is both very expensive and space consuming.

Therefore, an object of this invention is to provide a mooring arrangement where the ratio of anchors to WEC buoys is significantly decreased.

Another object of this invention is to ensure that the mooring anchors holding the WECs in place do not impede the relative motion of the components of the WECs which would interfere with their ability to generate useful energy.

SUMMARY OF THE INVENTION

In mooring systems embodying the invention, a plurality of WECs is disposed within a body of water with the WECs arranged such that each WEC is connected to three different anchors via 3 mooring lines spaced 120 degrees apart about the WEC. The ratio of the number of anchors per WEC is decreased by connecting each anchor to more than one WEC.

In one embodiment the WECs and their associated anchors are arranged to form an array of contiguous hexagonal shaped cells, each cell having 3 WECs and 3 anchors located at the vertices of the hexagon, with a WEC alternating with an anchor going around the perimeter of the cell, and each WEC connected to two anchors of its cell and an anchor of an adjacent contiguous cell.

In accordance with an embodiment of the invention, a mooring system includes a plurality of WECs and anchors deployed over the surface of a body of water in a generally triangular formation extending from an apex of the triangular formation to a base. There are N rows of anchors alternating with N rows of WECs deployed between the apex and base. The number (i) of anchors in a row is equal to the order (i) of the row and likewise the number (i) of WECs in a row is equal to the order (i) of the row. Thus, each successive row of WECs, further removed from the apex, includes one additional WEC per additional row and each successive row of anchors, further removed from the apex, also includes one additional anchor per additional row of anchors. At all times, the WECs of each row are connected to three anchors via mooring lines positioned at 120 degrees relative to each other. The mooring lines interconnect the WECs and the anchors to form contiguous hexagonal cells (except at the edges of the triangular formation).

For example, a first anchor defining a first anchor row and a first WEC defining a first WEC row form the apex of a triangular formation. A second row of anchors comprising 2 anchors is formed below the first WEC row and a second WEC row comprising 2 WECs is formed below the second anchor row. Then a third row of anchors comprising 3 anchors is formed below the second row of WECs and a third row of WECs comprising 3 WECs is formed below the third anchor row. This layout out pattern may be repeated for N rows of anchors and N rows of WECs with each additional row having one more anchor and one more WEC. As the number of rows is increased the number of anchors per WEC decreases getting closer to one anchor per WEC.

In accordance with the invention, a plurality of WECs and a plurality of anchors may be deployed in a diamond or rhombus formation (e.g., two triangular formations having a common base region) or in any desirable shape. The formation relying on the interconnection of contiguous cells, with each cell including three WECs and three anchors located at the vertices of the hexagon. As above, each WEC is connected to two anchors which are part of its cell and one anchor of an adjacent contiguous cell, and each interior cell shares an anchor and a WEC with an adjacent contiguous cell.

BRIEF DESCRIPTION OF THE DRAWINGS

In the accompanying schematic drawings, which are not drawn to scale, like reference characters denote like components.

DETAILED DESCRIPTION OF THE DRAWINGS

This invention relates to a mooring (anchoring) system for WECs to reduce the number of mooring anchors needed to maintain arrays of wave energy converters (WECs) disposed in a body of water in place and to thereby reduce the cost of mooring an array of WECs.

Figure 1:
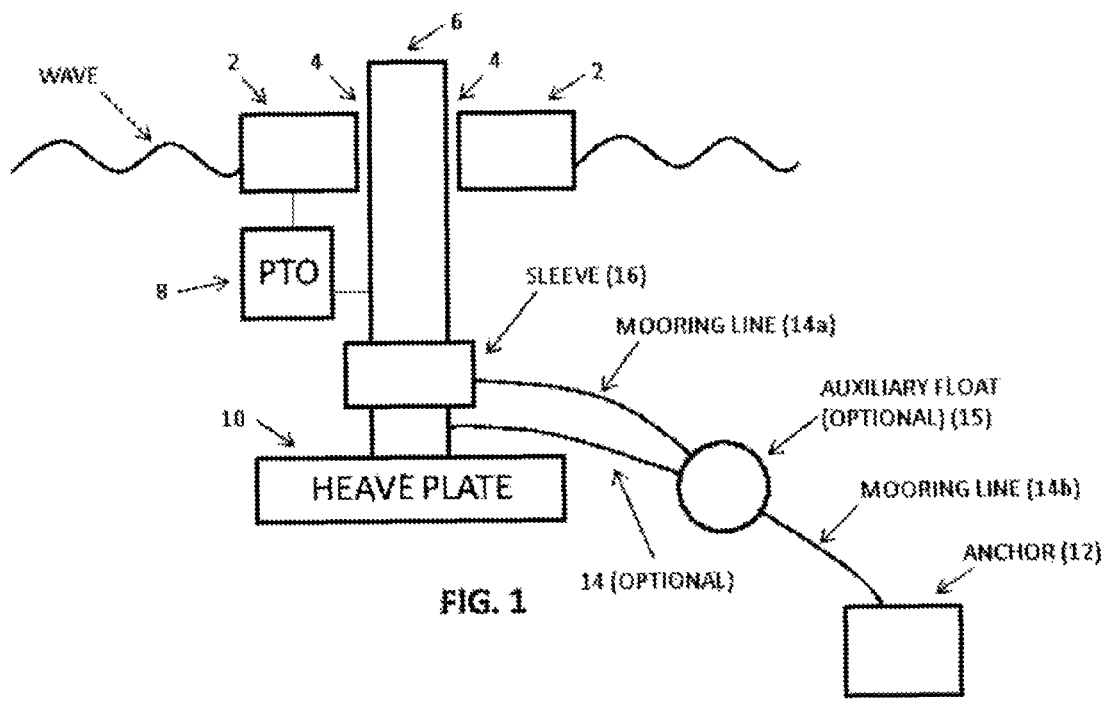
FIGS. 1 and 1A are highly simplified drawings showing a WEC suitable for practicing the invention and a mooring arrangement for the WEC.

An example of a WEC suitable for use with the present invention is shown, schematically, in FIG. 1. The WEC includes a generally flat (toroidal) float 2 having a central opening 4 there through and an elongated float 6, referred to as a "spar", slidably extending through the flat float central opening 4. The spar 6 and float 2 bob up-and-down in response to passing surface waves but in different phase relationships with the waves, hence there is relative motion between the spar and float. FIG. 1 shows that a heave plate 10 can be connected to spar 6 to increase its effective mass. The relative movements between the spar and float are used for generating useful energy by driving a power take off (PTO) device 8. The PTO may be any suitable transducer including, for example, a mechanical rack and pinion apparatus to drive an electric generator or a hydraulic cylinder for pressurizing a fluid used to drive a turbine for driving an electric generator.

Figure 1A:
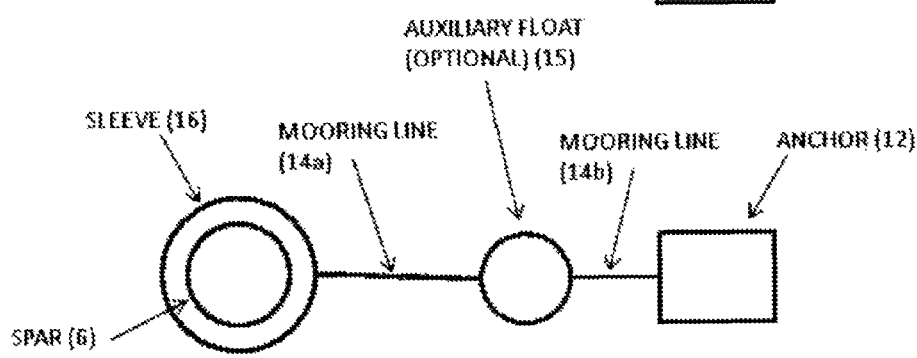

The spar 6 can be connected to an anchoring arrangement in many ways. FIGS. 1 and 1A show some example of suitable schemes using an auxiliary float 15. In FIG. 1 the spar 6 is shown directly connected via a mooring line 14 to an auxiliary float 15 which in turn is connected via a mooring line 14b to an anchor 12. Alternatively, as also shown in FIGS. 1 and 1A, a sleeve 16 can be formed around the spar and the sleeve can be connected via mooring line 14a to an auxiliary buoy 15 which can be connected via a mooring line 14b to an anchor 12. The auxiliary buoys are coupled via the mooring lines between the anchor and the buoy to keep the mooring from limiting the up and down motion of the buoy (spar). These auxiliary buoys are usually below the surface at approximately the same depth as the connection point to the as the connection point to the spar. The use of sleeves and auxiliary buoys eliminate a problem with anchors limiting the up and down motion of the buoy (spar). However, in cases where limiting the up down motion is not a problem, the anchors can be directly connected to the spar or to the sleeve, if one is formed around the spar. In all cases embodying the invention, the spar 6 (and or its sleeve 16) of each WEC is coupled to (three) anchors 12 spaced at 1120 degrees relative to each other to hold the spar in place so as to limit its lateral movement (in the horizontal direction), and that of its associated WEC, while allowing the spar to move up and down. Thus, a power buoy can be either directly connected to an anchor with a mooring line or be connected indirectly using any suitable means such as an auxiliary surface or subsurface buoy or float.

For increasing the amount of generated power, groups of WECs are interconnected to form "fields" or "farms" of WECs which are deployed in close proximity to each other within a body of water.

In accordance with this invention, groups of WECs are interconnected in patterns for covering the area of a two-dimensional surface. Many different patterns are possible. For ease of description, the use of regular polygons is disclosed. In the accompanying drawings and in the description below a WEC is also referred to as a buoy and identified by the letter "B". Using careful field layout it is possible to use a single structural anchor to service multiple WECs (Buoys). Many options are available, but a highly effective solution is outlined below.

Figure 2:
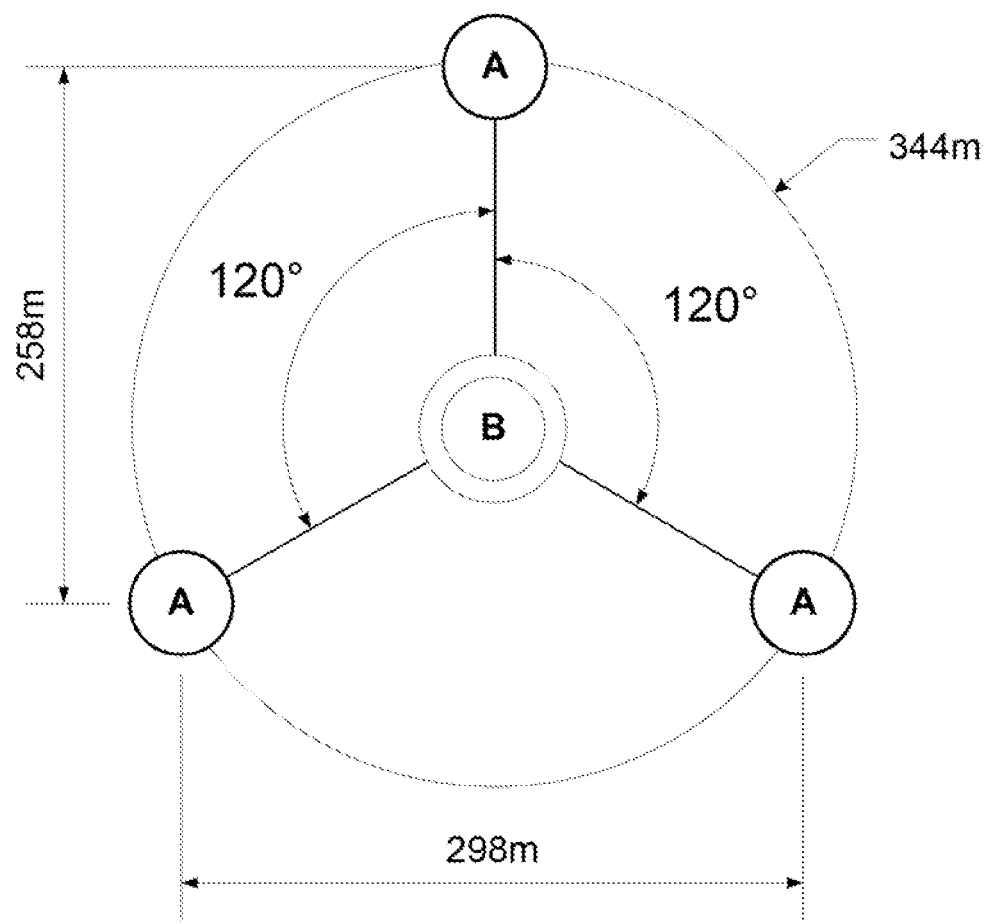
FIG. 2 is a drawing showing desired anchoring connections for a single WEC (buoy)

FIG. 2 shows a mooring system for a single WEC. Each WEC (Buoy) is shown to have three anchor points arranged at 120 degrees on a 344 m diameter circle surrounding the Buoy. In the figures the letter "A" denotes an anchor and the central graphic or letter "B" denotes a WEC or buoy. As noted above, the cost of each anchor is substantial; it may exceed $500,000.00. Therefore, where it is desired to have a "farm" of WECs to produce large amounts of energy, it is highly desirable to decrease the number of anchors per WEC.

Figure 3:
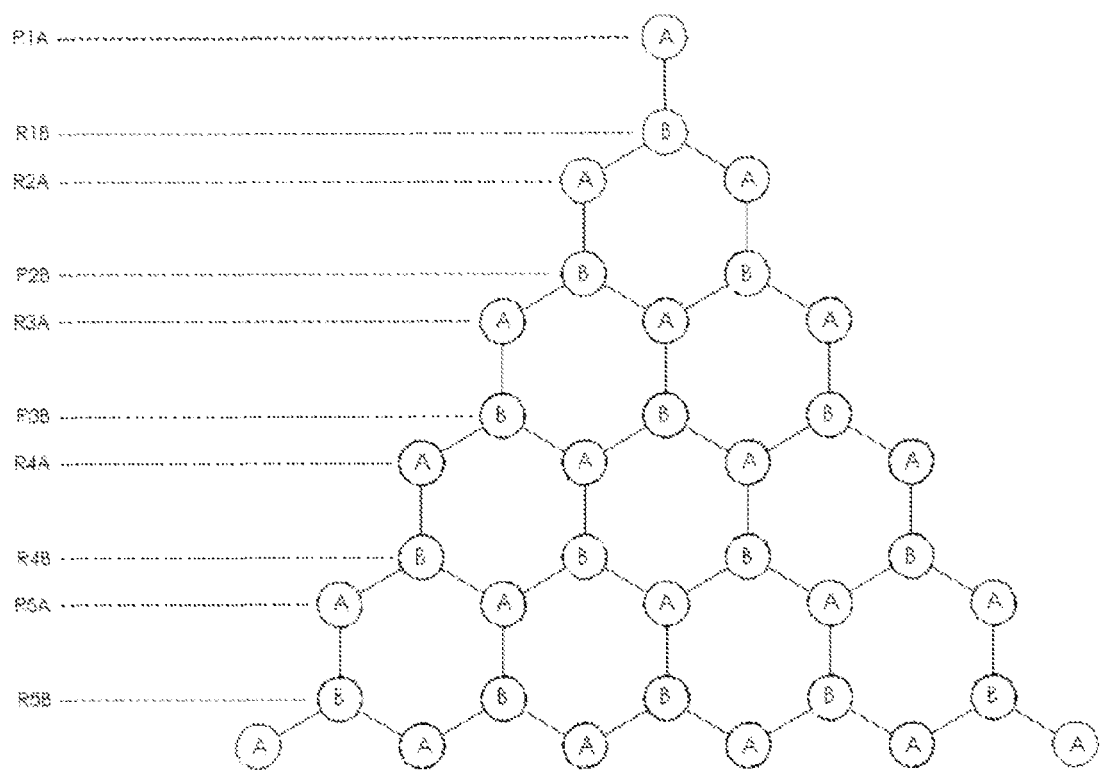
FIG. 3 is a drawing showing a plurality of WECs and anchors arranged in a triangular formation.

The invention will now be explained with respect to FIGS. 3, 4, 5 and 6. Referring to FIG. 3, note that an array of hexagonal cells of the type shown in FIG. 4 may be deployed to produce a triangular formation. The triangular formation may be viewed as consisting of a series of rows, with alternating rows of anchors and WECs. The first anchor row has one anchor and the first WEC row has one WEC. The elements of the first row define the apex of the triangular formation. Each additional row of anchors and WECs extending from the first row has an additional anchor or WEC. Thus, the second anchor row (R2A) has 2 anchors and the second WEC row (R2B) has 2 WECs. The third anchor row (R3A) has 3 anchors and the third WEC row (R3B) has 3 WECs. This pattern is repeated as the number of rows is increased. In general, each anchor row (RiA) has (i) (anchors) and each WEC row RiB has (i) (WECs); where "i" varies from 1 to N; where N may be any integer greater than 1.

Figure 4:
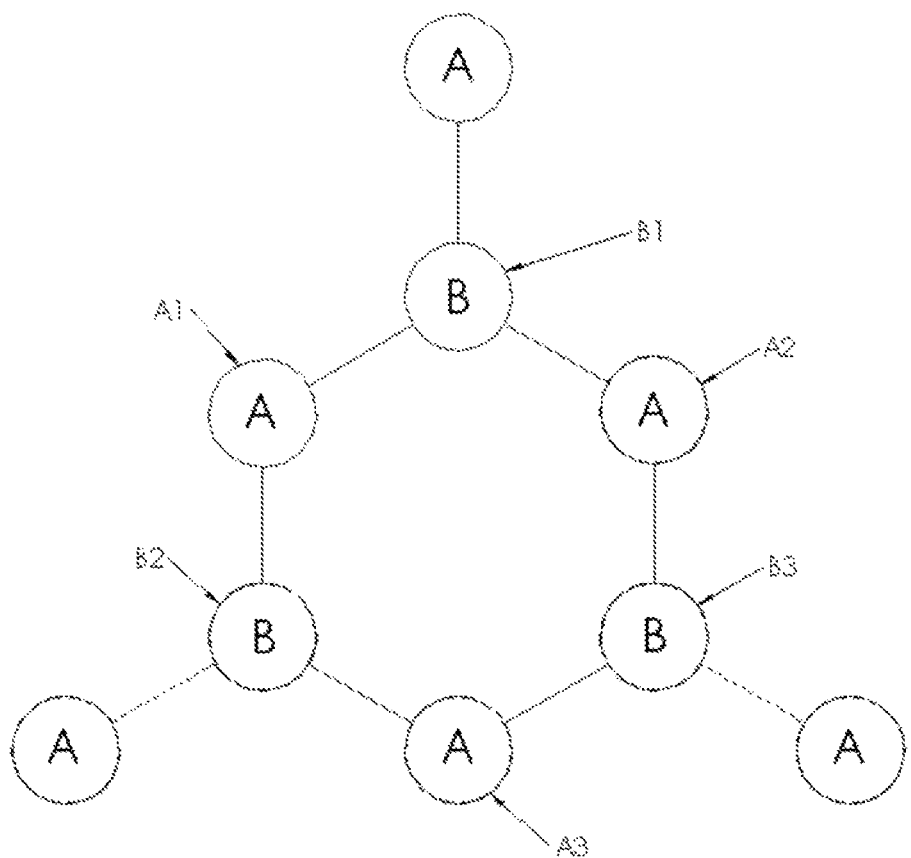
FIG. 4 is a drawing detailing a basic hexagonal cell including 3 WECs and 3 anchors in accordance with the invention.
Figure 5:
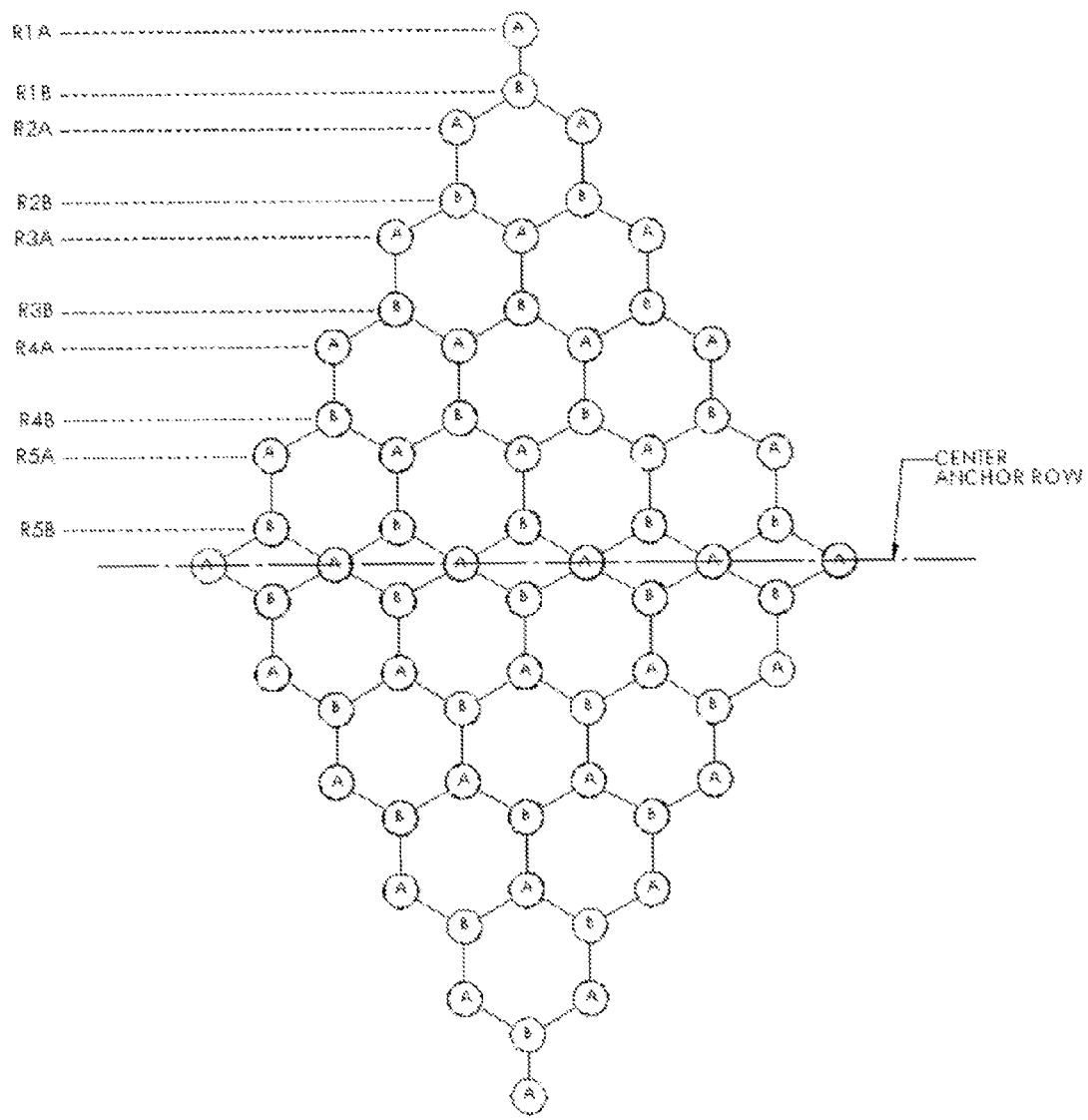
FIG. 5 is a drawing of a diamond shaped anchoring (mooring) layout for a plurality of WECs in accordance with the invention.
Figure 6:
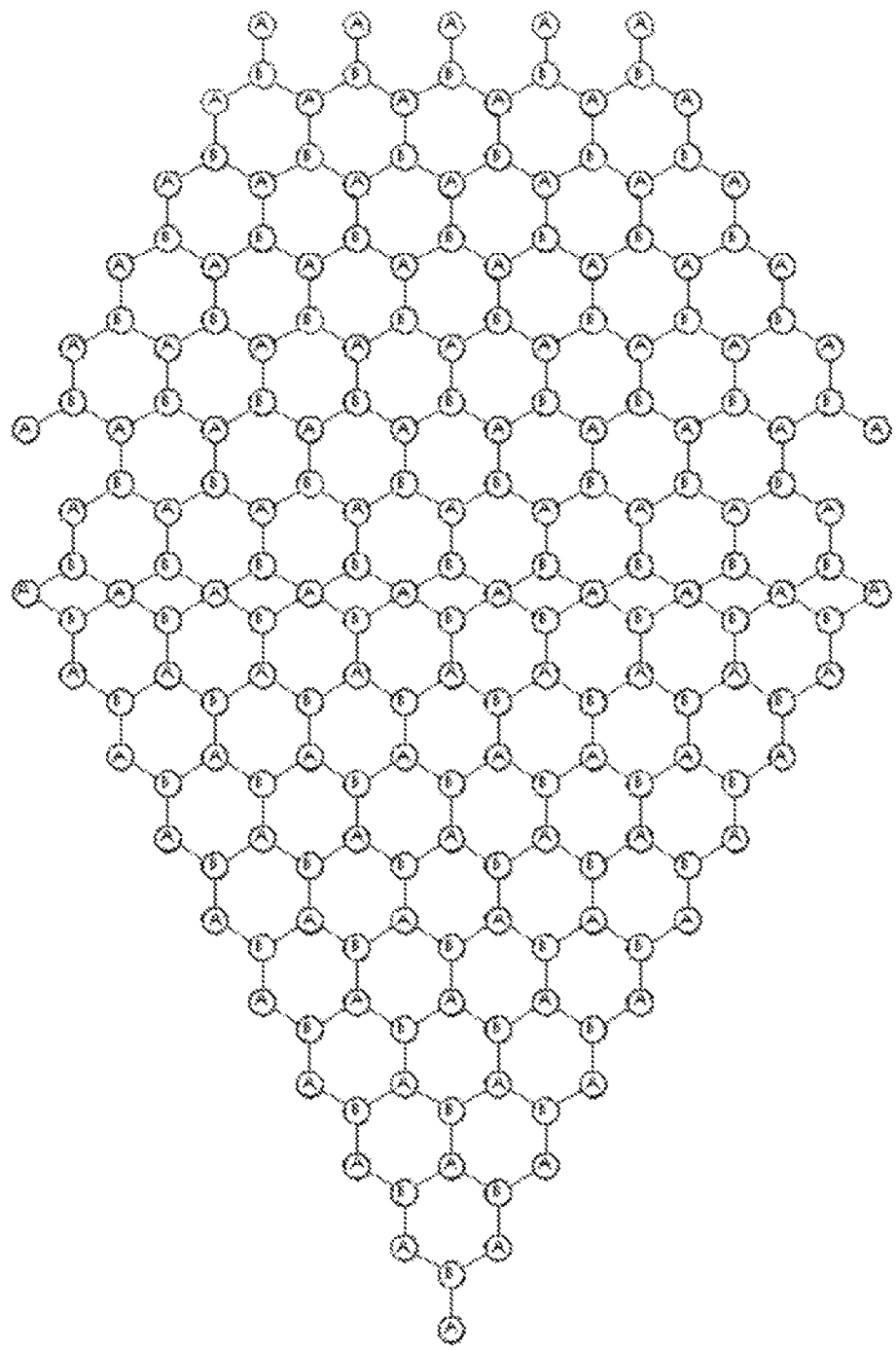
FIG. 6 shows a large array of WECs moored in accordance with the invention.

Note that the resulting structure shown in FIGS. 3, 5 and 6 may be viewed as groupings of arrays of contiguous hexagonal cells of the type shown in FIG. 4 to form a desired structure. FIG. 4 illustrates that in accordance with the invention, there is formed an array of hexagonal cells, having 6 vertices, where each cell includes 3 WECs (B1, B2, B3) and 3 anchors (A1, A2, A3) located at the vertices of the cell. These basic cells can be arranged to form a layout of the type shown in FIGS. 3, 5 and 6. Going around the perimeter of the cell it may be seen that the WECs and the anchors are located at alternate vertices. A WEC (B1) is located at one vertex of the cell and is connected to two anchors (A1, A2) located at the adjacent vertices to B1. A WEC (B2), located on the other side of anchor A1, is connected between anchors A1 and A3 and a WEC (B3), located on the other side of anchor A2, is connected between anchors A1 and A3. The connection of the WECs to the anchors is via mooring lines which are positioned at 120 degrees to each other.

Another aspect of the invention may be explained with respect to FIG. 5 which shows an array of Buoys and anchors arranged in a symmetrical diamond shaped design about a central row of anchors. The configuration of FIG. 5 may be produced by coupling the bottom most rows of two triangular formations of the type shown in FIG. 3. As shown in FIG. 5, each buoy has access to three anchor points as required by the layout identified in FIG. 2. Now, if we ignore for a moment the central row of anchors, each additional row moving from the central spine outwards, requires only 1 additional anchor per Buoy. Each Buoy makes use of two anchors which were already in place and already being used for other Buoys (WECs). Note that a very efficient number of anchors per WEC is obtained for a pattern which extends out to a symmetrical point of one (1) WEC and one (1) anchor.

As the number of rows of Buoys increases, the capital cost and impact of the central spine of anchors progressively reduces, as the system configuration progressively becomes more dominated by the requirement for 1 anchor for each additional Buoy.

The equation for this relationship for any size of Buoy farm becomes:

$$A = B + \frac{R}{2} + 1$$

Where: "B" is the number of Buoys; "A" is the number of anchors and R is the number of rows of Buoys arranged in the pattern identified in Error! Reference source not found.

The number of Buoys 'B' in a given field, given the number of rows 'R' can be calculated by the equation:

$$B = 0.25R^2 + 0.5R$$

And conversely, within the limits of a 50 megawatt (MW) farm, the number of rows 'R' may be found using the nearest integer solution of:

$$R = 1.5264B^{0.5427}$$

Using these equations, it can be shown, as set forth in Table 1, below, that a WEC/Buoy farm requires the following Buoy, anchor and row count when arranged per Error! Reference source not found, 5 or 6.

TABLE 1

|  | Rows | Anchors | Power (kW) |
|---|---|---|---|
| Buoys |  |  |  |
| 2 | 2 | 4 | 300 |
| 6 | 4 | 9 | 900 |
| 12 | 6 | 16 | 1800 |
| 20 | 8 | 25 | 3000 |
| 30 | 10 | 36 | 4500 |
| 42 | 12 | 49 | 6300 |
| 56 | 14 | 64 | 8400 |
| 72 | 16 | 81 | 10800 |
| 90 | 18 | 100 | 13500 |
| 110 | 20 | 121 | 16500 |
| 132 | 22 | 144 | 19800 |
| 156 | 24 | 169 | 23400 |
| 182 | 26 | 196 | 27300 |
| PB's |  |  |  |
| 210 | 28 | 225 | 31500 |
| 240 | 30 | 256 | 36000 |
| 272 | 32 | 289 | 40800 |
| 306 | 34 | 324 | 45900 |
| 342 | 36 | 361 | 51300 |
| 380 | 38 | 400 | 57000 |
| 420 | 40 | 441 | 63000 |
| 462 | 42 | 484 | 69300 |
| 506 | 44 | 529 | 75900 |
| 552 | 46 | 576 | 82800 |
| 600 | 48 | 625 | 90000 |
| 650 | 50 | 676 | 97500 |
| 702 | 52 | 729 | 105300 |

The ratio of the number of anchors to the number of WECs/PowerBuoys then becomes progressively better with field development size, with obvious cost benefits, as set forth in Table 2 below:

TABLE 2

| Power of field (kW) | Ratio of Anchors to PB150 PowerBuoys |
|---|---|
| 300 | 2.00 |
| 900 | 1.50 |
| 1,800 | 1.33 |
| 3,000 | 1.25 |
| 4,500 | 1.20 |
| 6,300 | 1.17 |
| 8,400 | 1.14 |
| 10,800 | 1.13 |
| 13,500 | 1.11 |
| 16,500 | 1.10 |
| 19,800 | 1.09 |
| 23,400 | 1.08 |
| 27,300 | 1.08 |
| 31,500 | 1.07 |
| 36,000 | 1.07 |
| 40,800 | 1.06 |
| 45,900 | 1.06 |
| 51,300 | 1.06 |
| 57,000 | 1.05 |
| 63,000 | 1.05 |
| 69,300 | 1.05 |
| 75,900 | 1.05 |
| 82,800 | 1.04 |
| 90,000 | 1.04 |

TABLE 2-continued

| Power of field (kW) | Ratio of Anchors to PB150 PowerBuoys |
|---|---|
| 97,500 | 1.04 |
| 105,300 | 1.04 |

Note:
Each row of the buoy farm may be sized according to the requirement to have 1 × full mooring line length plus 2 × other mooring line lengths at 120 degrees to the former, in accordance with FIG. 2. Each row of WECs (Power Buoys) therefore has a 'vertical' (per FIG. 2) extent of 258m and a single WEC has a horizontal mooring system extent of 298m. For a WEC farm design, the horizontal extent will be half of the vertical extent (using the reference directions from ERROR! REFERENCE SOURCE NOT FOUND.), leading to the field dimensions set forth in Table 3 below.

TABLE 3

| Power (kW) | Vertical Extent (km) | Horizontal Extent (km) | Physical Area (km²) |
|---|---|---|---|
| 300 | 0.52 | 0.26 | 0.07 |
| 900 | 1.03 | 0.52 | 0.27 |
| 1,800 | 1.55 | 0.77 | 0.60 |
| 3,000 | 2.06 | 1.03 | 1.07 |
| 4,500 | 2.58 | 1.29 | 1.66 |
| 6,300 | 3.10 | 1.55 | 2.40 |
| 8,400 | 3.61 | 1.81 | 3.26 |
| 10,800 | 4.13 | 2.06 | 4.26 |
| 13,500 | 4.64 | 2.32 | 5.39 |
| 16,500 | 5.16 | 2.58 | 6.66 |
| 19,800 | 5.68 | 2.84 | 8.05 |
| 23,400 | 6.19 | 3.10 | 9.59 |
| 27,300 | 6.71 | 3.35 | 11.25 |
| 31,500 | 7.22 | 3.61 | 13.05 |
| 36,000 | 7.74 | 3.87 | 14.98 |
| 40,800 | 8.26 | 4.13 | 17.04 |
| 45,900 | 8.77 | 4.39 | 19.24 |
| 51,300 | 9.29 | 4.64 | 21.57 |
| 57,000 | 9.80 | 4.90 | 24.03 |
| 63,000 | 10.32 | 5.16 | 26.63 |
| 69,300 | 10.84 | 5.42 | 29.35 |
| 75,900 | 11.35 | 5.68 | 32.22 |
| 82,800 | 11.87 | 5.93 | 35.21 |
| 90,000 | 12.38 | 6.19 | 38.34 |
| 97,500 | 12.90 | 6.45 | 41.60 |
| 105,300 | 13.42 | 6.71 | 45.00 |

FIG. 6 illustrates that WECs and anchors may be deployed in accordance with the invention to cover any desired area and/or to form any desired pattern.

What is claimed is:

1. Apparatus for mooring an assembly of wave energy converters (WECs) to a floor of a body of water comprising:
a plurality of contiguous cells, each cell consisting of first second and third WECs and of first, second and third anchors, each anchor being attached to the floor of the body of water, and each cell being hexagonal in shape and having six vertices, with each one of said WECs and anchors being located at a different one of said vertices with said first WEC being connected to said first and second anchors via first and second mooring lines, said second WEC being connected to said first and third anchors via third and fourth mooring lines, and said third WEC being connected to said second and third anchors via fifth and sixth mooring lines; and
the first, second and third WECs being also connected via respective mooring lines to anchors external to said cell such that each said WEC is connected via three mooring lines to three different anchors; and wherein each said anchor is connected to no more than 3 WECs.

2. The apparatus for mooring an assembly of WECs according to claim 1, wherein pairs of said cells are contiguous to one another along cell boundaries and contiguous cells share a WEC and an anchor at boundaries between respective pairs of cells.

3. The apparatus for mooring an assembly of WECs according to claim 1, wherein said body of water has a surface, and wherein each WEC includes a float and a spar which move up and down relative to each other in response to waves along the surface of said body of water; and wherein the spar is coupled to 3 anchors to limit lateral movement of the spar, while allowing relative motion between the float and the spar.

4. The apparatus for mooring an assembly of WECs as claimed in claim 1, wherein each one of said WECs includes first and second bodies, with the first body designed to move generally in phase with the waves and generally out of phase with respect to the second body; and wherein connection to the anchor is made via a mooring line between the second body and the anchor.

5. The apparatus for mooring an assembly of WECs as claimed in claim 1, wherein each WEC includes a first float having a central opening and a second elongated float extending through the central opening, said first float moving generally in phase with the waves and said second float moving generally out of phase with the waves.

6. The apparatus for mooring an assembly of WECs according to claim 2, wherein each said cell has a perimeter; with the vertices being disposed along the perimeter; and wherein in going around the perimeter the WECs and the anchors are alternately located.

7. A method for mooring an assembly of wave energy converters (WECs) using anchors to a floor of a body of water comprising the steps of:
   arranging the assembly of WECs into a plurality of contiguous hexagonal cells, each hexagonal cell comprised of first, second and third WECs and first, second and third anchors;
   connecting the first WEC to the first and second anchors via first and second mooring lines;
   connecting the second WEC to the first and third anchors via third and fourth mooring lines;
   connecting the third WEC to the second and third anchors via fifth and sixth mooring lines; and further interconnecting the WECs and the anchors such that each said WEC is connected to no more than three anchors and each said anchor is connected to no more than three said WECs; and
   wherein said cells are disposed in a pattern of contiguous cells for reducing the number of anchors.

8. Apparatus for mooring an assembly of wave energy converters (WECs) to a floor of a body of water comprising:
   a first plurality of WECs;
   a second plurality of anchors; each of said anchor being attached to the floor of the body of water;
   said WECs and the anchors being deployed to form a generally triangular formation having an apex and a base; said anchors and WECs being deployed in alternate rows extending from the apex to the base; each successive row of WECs positioned further away from the apex includes one additional WEC per successive row of WECs and each successive row of anchors positioned further away from the apex includes one additional anchor per successive row of anchors; and
   the WECs of each row being connected to three adjacent anchors via mooring lines positioned at 120 degrees relative to each other.

9. The apparatus for mooring an assembly of WECs as claimed in claim 8, wherein there are N+1 rows of anchors and N rows of WECs; where the rows are ordered and N is an integer greater than 1; and wherein the number of anchors in a row is equal to the order of the row and the number of WECs in a row is equal to the order of the row.

10. The apparatus for mooring an assembly of WECs as claimed in claim 8, wherein said first plurality of WECs and said second plurality of anchors are deployed to form a first and a second triangular formations extending from a center row of anchors.

11. The apparatus for mooring an assembly of WECs as claimed in claim 8, wherein each WEC includes first and second bodies, with the first body designed to move generally in phase with the waves and generally out of phase with respect to the second body; and wherein connection to the anchor is made via a mooring line between the second body and the anchor.

12. The apparatus for mooring an assembly of WECs as claimed in claim 9, wherein the number of anchors, A, is equal to:

$$A = B + R/2 + 1$$

where: "B" is the number of WECs; "A" is the number of anchors and R is the number of rows of WECs.

* * * * *